No. 649,110. Patented May 8, 1900.
T. P. RITZEMA.
LINOTYPE MACHINE.
(Application filed Mar. 4, 1898.)
(No Model.) 4 Sheets—Sheet 4.
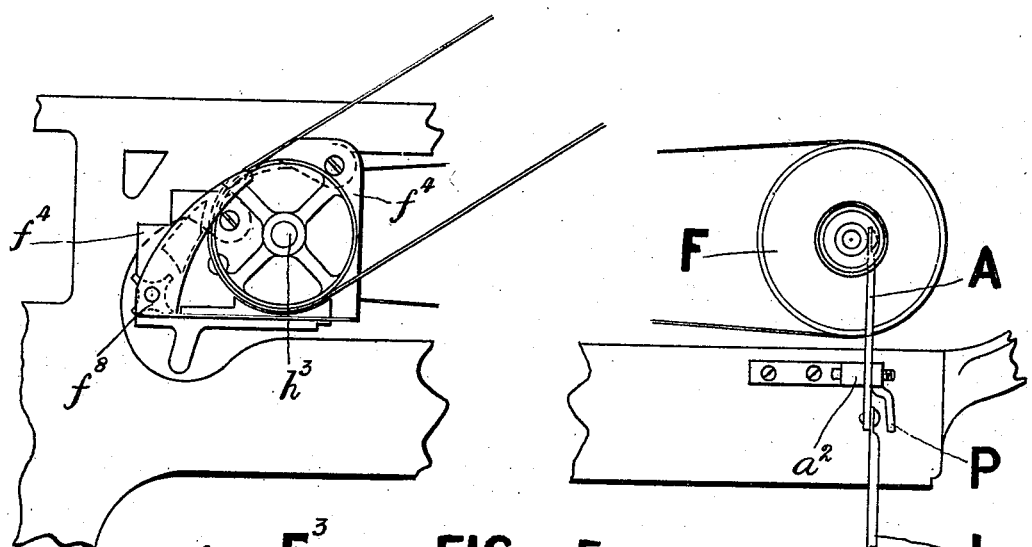
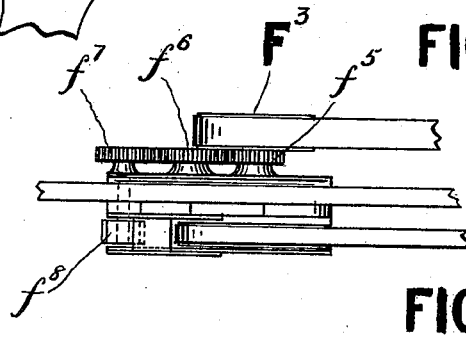
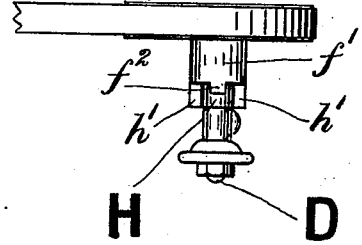
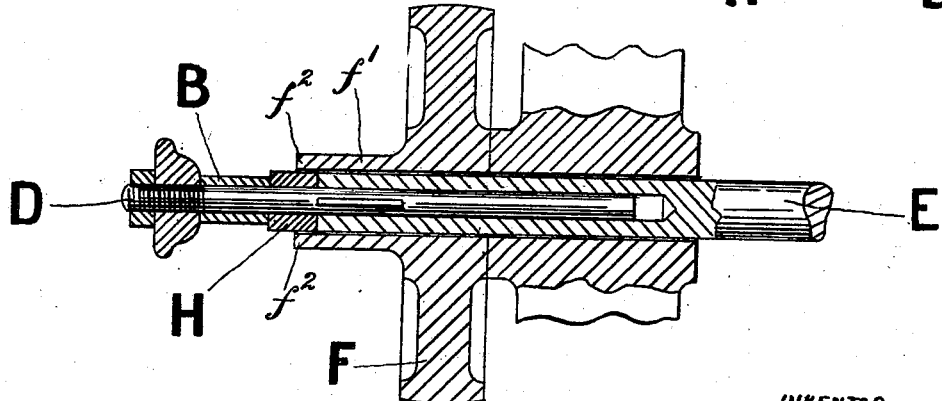
WITNESSES:
INVENTOR
Thomas Purvis Ritzema
BY
Richards Co
ATTORNEYS

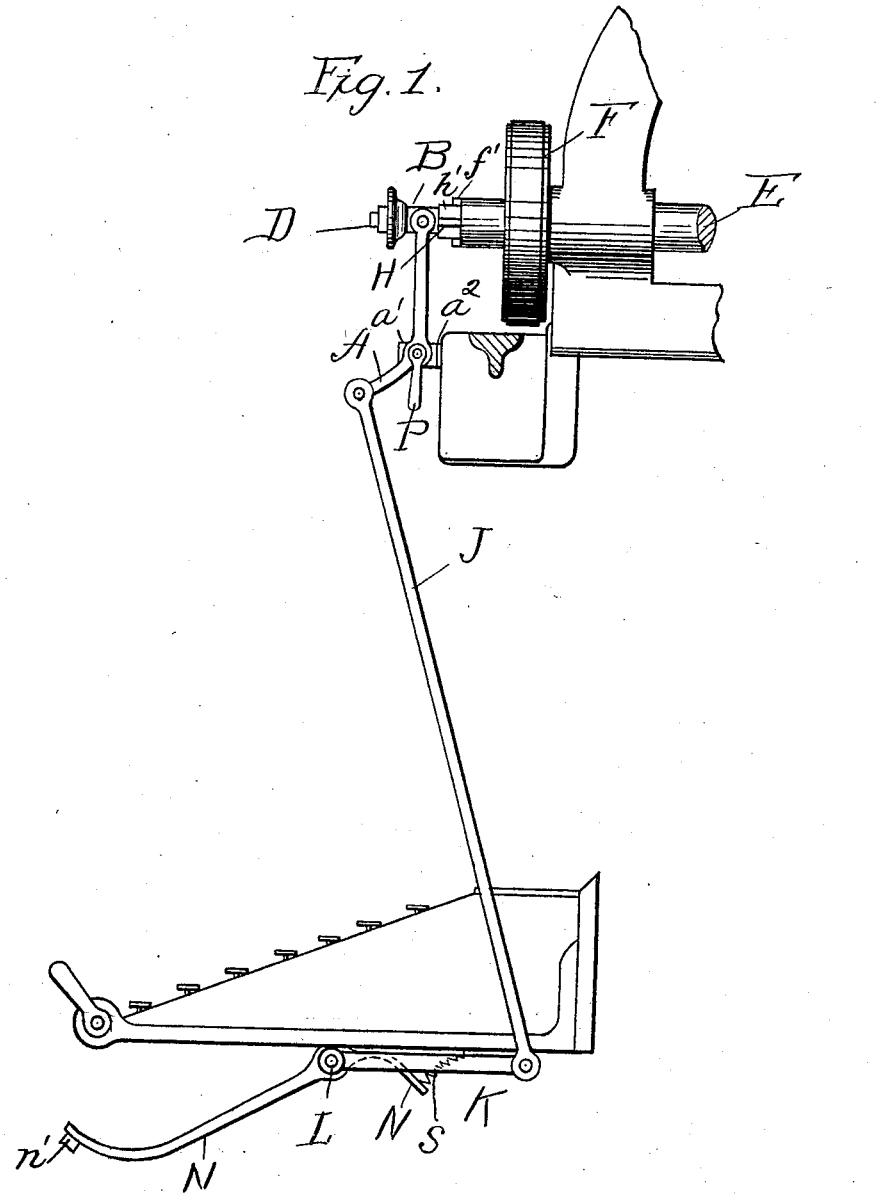

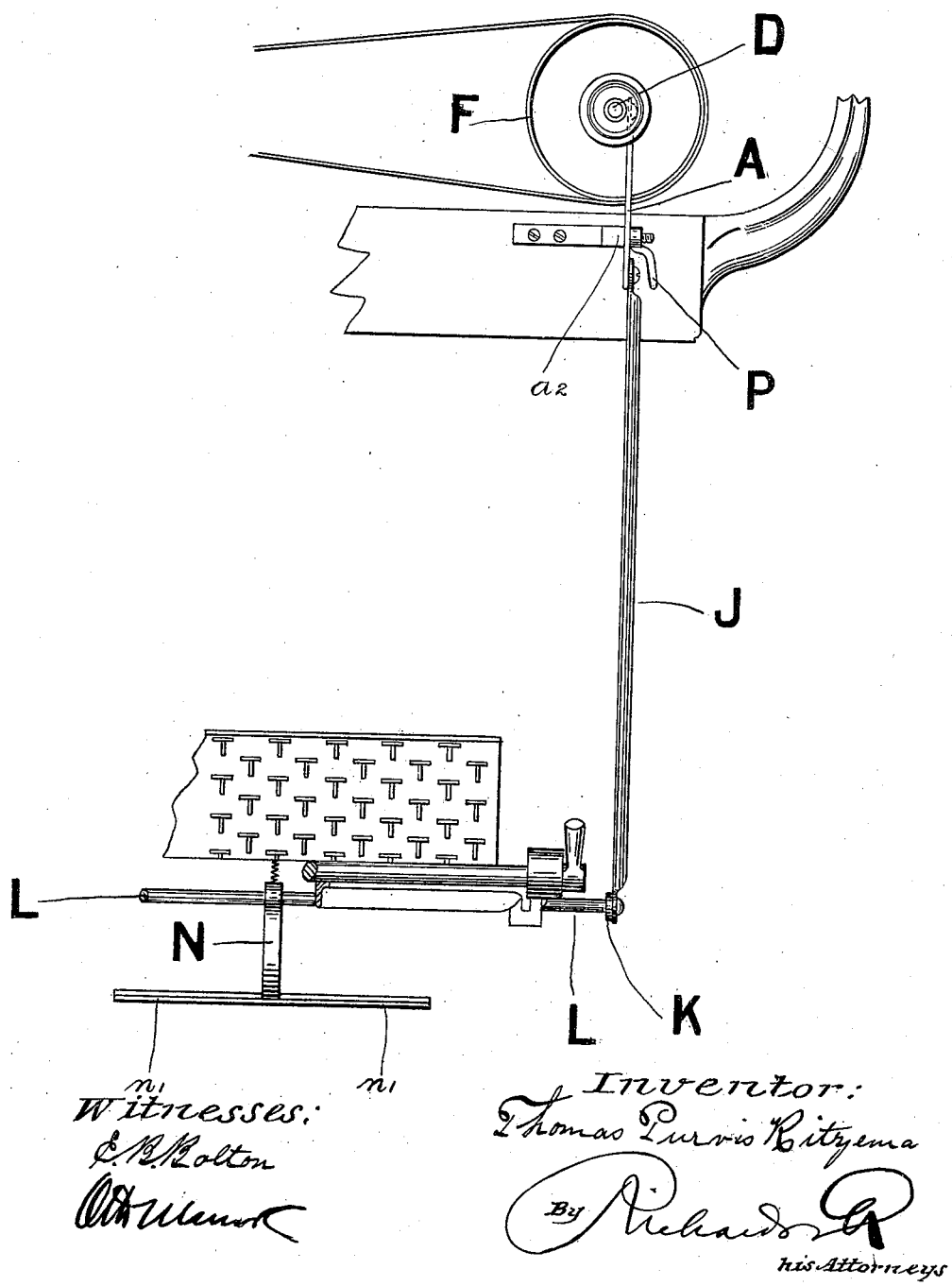

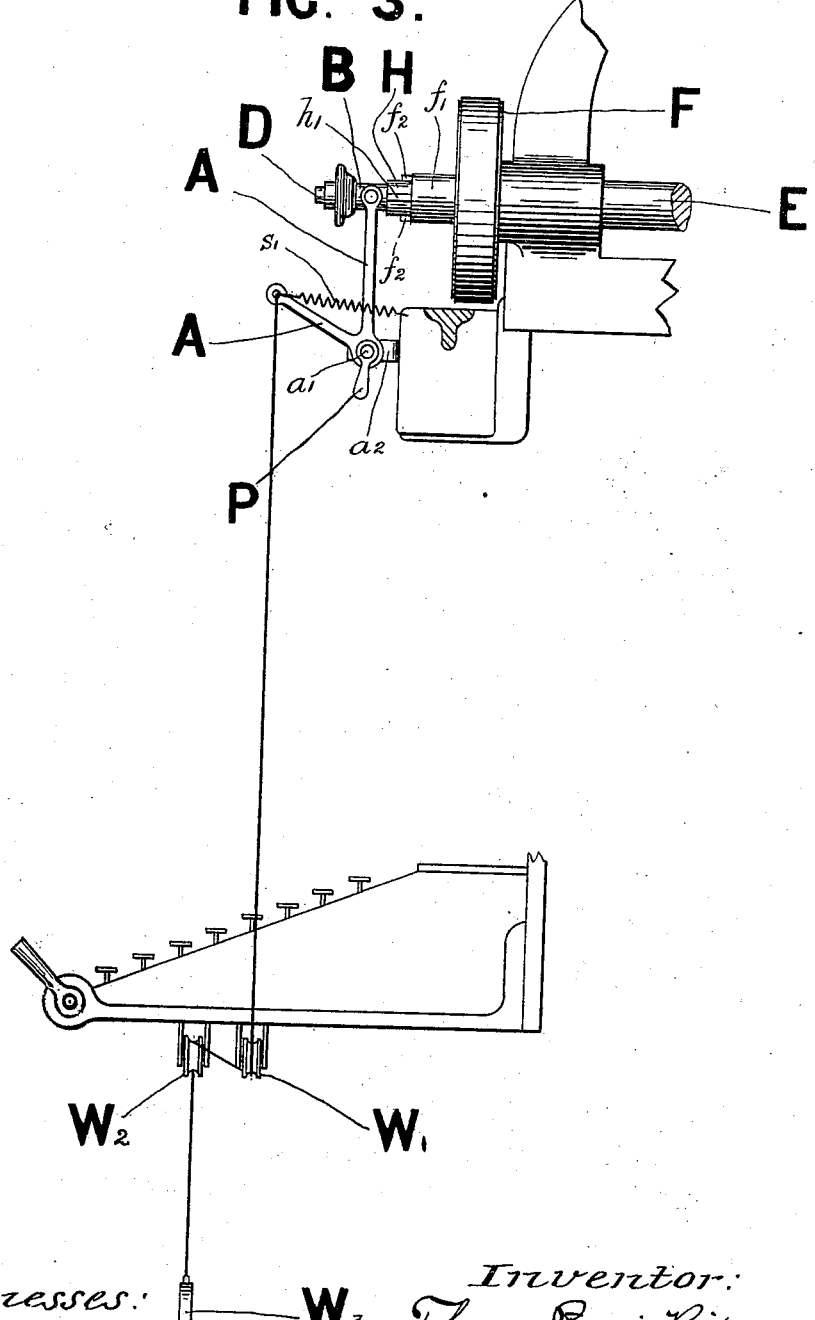

UNITED STATES PATENT OFFICE.

THOMAS PURVIS RITZEMA, OF BLACKBURN, ENGLAND.

LINOTYPE-MACHINE.

SPECIFICATION forming part of Letters Patent No. 649,110, dated May 8, 1900.

Application filed March 4, 1898. Serial No. 672,596. (No model.)

*To all whom it may concern:*

Be it known that I, THOMAS PURVIS RITZEMA, newspaper proprietor and justice of the peace, a subject of the Queen of Great Britain, residing at Quarry Glen, Blackburn, in the county of Lancaster, England, have invented certain new and useful Improvements in Linotype-Machines; and I do hereby declare the following to be a full, clear, and exact description of the invention, such as will enable others skilled in the art to which it appertains to make and use the same.

My invention has for its object improvements in linotype-machines, having special reference to the operation of the gear in connection with the mechanism for assembling or arranging the matrices. The clutch has hitherto been worked by one hand of the operator, and after the clutch has been somewhat worn by use it is liable to work out of gear, which causes the star-wheel, which assembles or arranges the matrices, to stop, thus causing the matrices to accumulate at the bottom of the chute under the separating-guides leading from the magazine, thus producing confusion and hindrance to the operator. My present invention is designed to prevent this confusion, and consists in adding to the machine—say under the keyboard—a rocking shaft, which carries an arm over the thigh of the operator, which arm is normally upon or near the thigh and which is so held by a spring or weight on another arm of the rocking shaft. Another arm projects from the rocking shaft, which is pivoted to an ascending rod, which operates a bell-crank lever, which is hung to the frame of the machine, and the upper arm embraces the small clutch, which commands the star-wheel gear in such a manner that the normal tendency of the spring or weight is to keep the clutch in gear with the counter-shafts which work the star-wheel, so as to maintain it in constant action; but when the operator by his thigh or other portion of his leg or foot operates the lifting-lever the clutch is withdrawn and the mechanism stops without the hands of the operator being brought into use. It will, however, be obvious that a cord, gut, or chain may be substituted for one or more of the rods or levers and may pass over friction-pulleys in such a manner as to draw the clutch out of gear with a spring or counterweight to give the normal tendency to keep the clutch in gear. I also fix a stop or locking-handle, so that the operator can lock the clutch or parts operating it out of gear by simply turning a handle.

In order that my invention may be clearly understood and more easily carried into practical effect, I have appended hereunto four sheets of drawings upon which I have illustrated an example of the same.

Figure 1 is a front view of my arrangement for operating the clutch. Fig. 2 is a side view of Fig. 1. Fig. 3 is a similar view to Fig. 2, showing a modification. Fig. 4 is a front view of the star-wheel which assembles or arranges the matrices. Fig. 5 is a plan view of Fig. 4. Fig. 6 is an enlarged longitudinal section of the clutch.

In carrying my invention into practice I pivot one end of the bell-crank lever A to the sleeve B, and this lever A is pivoted at $a'$ to the frame of the machine. The sleeve B is mounted on one end of the spindle D, and this spindle D fits into the partially-hollow spindle E and is free to slide therein. Mounted loosely on the shaft E is the driving-pulley F with its boss $f'$, and on the face of this boss are formed the projections $f^2$, which engage with the projections $h'$, formed on the clutch H, which is fixed on the spindle D. A gear-wheel is fixed on the end of the shaft E, gearing with another gear-wheel mounted on a shaft connected to the working parts of the machine. Pivoted to the other end of the bell-crank lever A is one end of the connecting-rod J, the other end being pivoted to one end of the lever K, and to the other end of this lever K, I fix the rocking bar L, which is supported in bearings connected to the frame of the machine under the keyboard. Fixed at or about the center of this rocking bar is the rod or lever N, which carries the arm $n'$, fixed in such a position that it is over the thigh or knee of the operator, or the rod or lever N may be arranged so as to be operated by the foot of the operator. The coiled spring S is fixed to the rod or lever N, so as to hold it in its normal position.

It will be readily understood that when the operator lifts or raises the arm $n'$ with his knee or thigh the rocking shaft L will turn in its bearings, thereby tilting the lever K, which causes the connecting-rod J to move the bell-crank lever A on its pivot $a'$, by which means the spindle D is drawn forward. Consequently the projections $h'$ on the clutch H are disengaged from the projections $f^2$, and the pulley F, which is mounted loosely on the shaft E, ceases to revolve, thus stopping the mechanism for assembling or arranging the matrices; but immediately the arm $n'$ is released the spring S draws the rod or lever N into its normal position, thus causing the projections on the clutch H to again engage with the projections $f^2$, and the mechanism is restarted.

In order to keep the clutch out of action when the operator leaves the machine or for other purposes, I fix the handle P on the pivot $a'$, which is screw-threaded, and by turning the handle it locks or binds the bell-crank lever A against the collar $a^2$, thus holding the clutch out of contact. A cord, chain, gut, or the like may be used in place of the rod J.

The pulley F drives the small pulley $F^3$, mounted in a bearing in the plate $f^4$, bolted to the frame of the machine. When the pulley F is set in motion, it transmits motion to the pulley $F^3$ and gear-wheel $f^5$, mounted on the spindle $h^3$ of this pulley. This gear-wheel $f^5$ gears with the gear-wheel $f^6$, mounted on the plate $f^4$. It will thus be seen that when the pulley F is set in motion it transmits motion to the pulley $F^3$ and gear-wheels $f^5$, $f^6$, and $f^7$, thereby causing the star-wheel $f^8$ to revolve, which assembles and arranges the matrices.

The only reason the clutch is manually operated is because if anything goes wrong with the matrices or the wrong matrix is brought down or the dropping of the matrices has to be stopped through any other cause the operator can at any moment stop the mechanism which actuates these matrices without stopping the machine.

At Fig. 3 I have shown a modified form of my method of operating the clutch H. In this case I attach the chain, cord, gut, or the like to the lower end of the bell-crank lever A, and this cord passes over the guide-pulleys $W'$ and $W^2$, fixed under the keyboard. To the lower end of this cord I attach the stirrup $W^3$, which is situated in a convenient position, so that the operator can easily pull the cord with his foot or leg, by which means the clutch is disengaged when required. The spring $s'$, which is attached to the bell-crank lever and the frame, pulls the clutch back into action again.

In some cases I may dispense entirely with the levers and operate the clutch by a cord, chain, gut, or the like passing over pulleys and mounted to the frame of the machine in such a manner as to pull the clutch out by a direct pull, so dispensing with the bell-crank lever. On the other hand, I may retain the knee or leg lever N, running a cord or gut from it to the clutch or to the bell-crank lever.

What I claim then is—

1. In combination in a linotype-machine, the star-wheel mechanism for operating the same including a clutch a spring for throwing said clutch into operation to insure the operation of the star-wheel and means for operating said clutch manually arranged to be operated by a part of the operator other than his hand, said manual operation throwing the clutch out to stop the star-wheel, substantially as described.

2. In combination, the star-wheel, means for operating the same including a clutch a spring for throwing the clutch into operation, means to be operated by a part of the operator other than his hand, a connection therefrom to the clutch including the bell-crank lever A and the part for operating the same and the spring for holding the clutch normally in engagement, substantially as described.

3. In combination, the star-wheel, means for operating the same, a clutch controlling the operation of said means, manually-operating devices for throwing the clutch out of operation, a locking device for holding the clutch out of action, and a spring for throwing the clutch into operation, substantially as described.

In testimony whereof I affix my signature in presence of two witnesses.

THOMAS PURVIS RITZEMA.

Witnesses:
GEO. W. PICKUP,
JAMES BRADLEY.